C. H. FOSTER.
SHOCK ABSORBING DEVICE.
APPLICATION FILED OCT. 11, 1911.
1,089,828.
Patented Mar. 10, 1914.
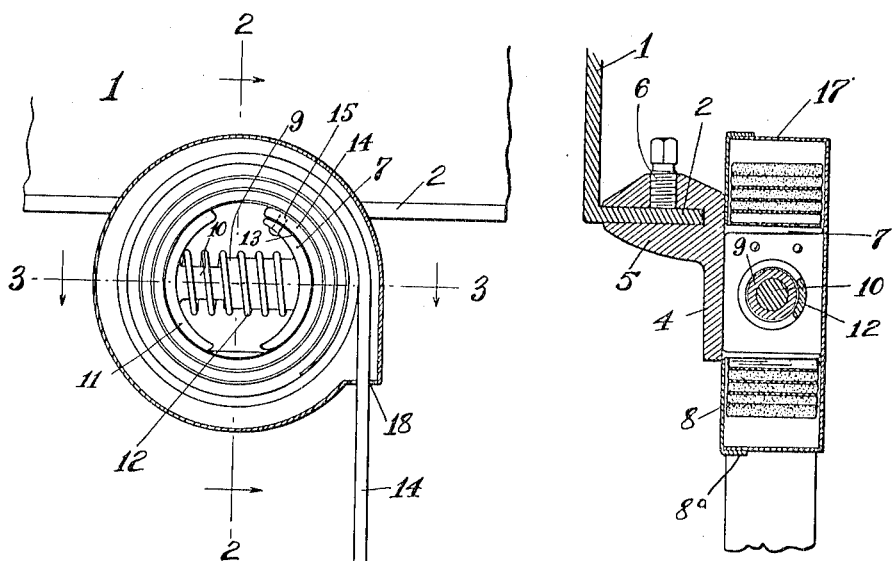
FIG. 1
FIG. 2
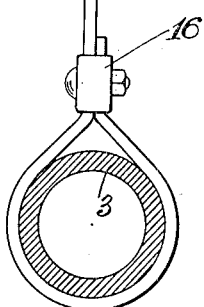
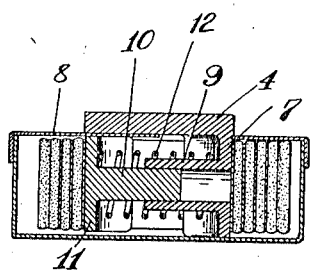
FIG. 3
Witnesses:
Inventor
Claud H. Foster
By Hull & Smith
Att'ys

UNITED STATES PATENT OFFICE.

CLAUD H. FOSTER, OF CLEVELAND, OHIO.

SHOCK-ABSORBING DEVICE.

1,089,828.  Specification of Letters Patent.  Patented Mar. 10, 1914.

Application filed October 11, 1911.  Serial No. 654,089.

*To all whom it may concern:*

Be it known that I, CLAUD H. FOSTER, a citizen of the United States, residing at Cleveland, in the county of Cuyahoga and State of Ohio, have invented a certain new and useful Improvement in Shock-Absorbing Devices, of which the following is a full, clear, and exact description, reference being had to the accompanying drawings.

This invention relates to shock absorbing devices such as are interposed between the axles and bodies of vehicles or other relatively movable members for the purpose of reducing the extent of vibration or relative movement of such members, whereby injury to and excessive and injurious movement of the springs (in the case of vehicles) and of the connected members are prevented. The invention disclosed herein is of the same general type as that disclosed in my application No. 426,144 filed April 9th, 1908, and in my application No. 639,702 filed July 21, 1911. As is the case with the inventions of the aforesaid applications, the device disclosed herein comprises a flat spiral spring one end of which is operatively connected to one of the relatively movable parts with which such device is to be associated, while the other end is operatively connected with the other part, a pliable or flexible strap or band being wrapped around the spring, the arrangement being such that any movement tending to separate the relatively movable parts will be cushioned by the spring while the latter is protected from injury by the frictional drag exerted by and between the convolutions of the strap or band. The pliable band or strap is shown herein as connected to the spiral or helical spring in such manner as to form therewith a composite flexible band, the pliable band exerting a frictional drag between the convolutions of the spring band, thus protecting the central spring against sudden shocks.

In the particular embodiment of my invention disclosed herein, the closing of the central portion of the helical spring band is resisted, not only by the convolutions of the spring band itself, but by an additional yielding resistance inserted within the center of the same, such resistance, in the embodiment shown herein, being provided by means of a cylindrical compression spring.

It is the general purpose and object of this invention to provide a device of the character referred to that is simple in construction, easy of application to the parts with which it is associated and which is particularly durable and efficient in operation. I accomplish the foregoing objects and other objects which will appear hereinafter by the construction illustrated in the drawings forming a part hereof, wherein—

Figure 1 represents a side elevation of a vehicle frame and a sectional view of an axle, to which parts my invention is shown as applied. Fig. 2 represents a sectional detail corresponding to the line 2—2 of Fig. 1; and Fig. 3, a sectional detail corresponding to the line 3—3 of Fig. 1.

Describing by reference characters the various parts illustrated. 1 denotes one of the side frames of a vehicle body, such frame being of ordinary channel construction, the bottom flange of the channel being indicated at 2.

3 denotes the axle of the vehicle.

The spring is omitted for clearness of illustration.

4 denotes a base, which may be of rigid metal, said base being provided with an angular extension 5 having an elongated slot for the reception of the flange 2, a set screw 6 being provided for clamping the extension and base to the flange.

7 denotes an arcuate projection carried by the base and extending at right angles therefrom, and 8 denotes the bottom of a casing (preferably of sheet metal) which is mounted upon said base. Rigid and preferably integral with the projection 7 is a tubular supporting member 9. This member telescopically receives a complementary member 10 carried by an arcuate projection 11 opposed and similar to the projection 7. A cylindrical spring of the compression type surrounds and is supported by the members 9 and 10 and has its opposite ends abutting against the arcuate projections 7 and 11.

13 denotes a flat spring metal band which is secured to one end of the projection 7 and is wrapped around said projection and the complementary projection 11. 14 denotes a band of flexible friction material, such as leather, canvas, or belting, which is also secured to one end of the projection 7 outside the former band and conveniently by the same rivets 15 by which the band 13 is secured thereto. These two plies or bands of metal and flexible material form a composite band which is wrapped a number of times around the central portion provided by the projections 7 and 11 and the interposed spring 12. The outer end of the spring band 13 preferably does not extend to the extreme outer portion of the composite coil. In practice, I find it advisable to have nearly one more turn of the flexible band 14 than of the metal band or strap 13. The outer or free end of this band of flexible material is shown as secured to the axle 3 by means of a suitable clamping device 16.

For the purpose of protecting the parts from dust, the parts may be inclosed in a suitable housing 17 of sheet metal fitted within a flange $8^a$ carried by the bottom member 8 of said housing. The housing proper is provided with an opening 18 for the passage of the flexible strap or band.

With the parts constructed as described, it will be apparent that any force tending to separate the two relative movable members will tend to contract or close the composite coil and that this tendency will be resisted by the cylindrical spring 12. Under extreme conditions, the movable projection 11 substantially contacts with the fixed projection 7. In order to prevent any distortion or kinking of the bands 13 and 14, the ends of the projections 11 and 7 which are opposite the end to which the bands are attached will be in substantially the same plane, while the end of the projection 11 which is complementary to the end of the projection 7 to which the bands are attached will be extended beyond the latter a distance substantially equal to the combined thickness of the bands. By this construction, the composite band may be wrapped around the projections 11 and 7 without any distortion in passing from one of said projections to and around the other.

A great advantage of the construction shown herein lies in the fact that the closing or contraction of the central part of the spring band is resisted by a spring of the cylindrical or compression type which is capable of standing indefinitely the strain to which it is subjected. Moreover, providing the curved projections 7 and 11 for the combined spring and flexible band allows the composite band thus formed to contract evenly and open or expand in like manner. By using the spring metal band 13 and interposing the same between the successive turns of the band 14, the latter is caused to open up freely as the two relatively movable members approach each other, whereby the compression spring at the center is permitted to expand and be in condition to receive and cushion the next shock incident to a separation of the relative movable members. Furthermore, the flexible band 14 serves as a friction drag between the convolutions of the spring metal band and thus retards the contraction of the central portion of said band and of the spring 12 within the same, cushioning the shocks transmitted to said spring.

While my invention is shown as applied to two vehicle members, it is evident that it may be applied to any other relatively movable members, to resist their separation and to cushion the movements.

Having thus described my invention, what I claim is:

1. The combination of a compression spring, a flexible device wrapped around said spring, and a supporting member interposed between said device and said spring.

2. The combination of a compression spring, a flexible band wrapped around said spring, and relatively fixed and movable supporting members interposed between said band and said spring.

3. The combination, with a pair of relatively movable members, of a shock absorbing device comprising a compression spring, a flexible band wrapped around said spring, abutments for the ends of said spring and operatively interposed between such ends and said band, means connecting one end of the band to one of said members, and means connecting the other end of said band to the other member.

4. A shock absorbing device comprising a compression spring, a flexible band wrapped around said spring, and relatively movable abutments operatively interposed between the ends of said spring and said band.

5. The combination, with a pair of relatively moving members, of a shock absorbing device comprising a base, a curved projection carried by the base and provided with a spring supporting member, a curved projection complementary to the first mentioned projection and provided with a spring supporting member, the last mentioned members being telescopically fitted one within the other, a spring surrounding the spring supporting members, a flexible band having its inner end connected with said base and wrapped around said projections, means connecting the base to one of the first-mentioned members, and means connecting the outer end of the band with the other of said members.

6. A shock absorbing device comprising a curved projection provided with a spring supporting member, a curved projection complementary to the first mentioned projection and provided with a spring supporting member, said members being slidably fitted together, a spring surrounding said members, and a flexible band wrapped around said members.

7. The combination, with a pair of relatively movable members, of a compression spring, a band of pliable material wrapped around said spring, a band of spring metal also wrapped around said spring and interposed between the convolutions of the former band and connected thereto, means connecting one end of the first mentioned band to one of the members, and means connecting the opposite end of said band to the other member.

8. The combination, with a pair of relatively movable members, of a compression spring, a composite band of flexible material and spring metal wrapped around said spring, means connecting one end of the band to one of the members, and means connecting the opposite end of said band to the other member.

9. The combination, with a pair of relatively movable members, of a pair of telescoping spring supporting members, a spring surrounding said members, a curved projection carried by each of the last mentioned members, a band wrapped around said projections and having its inner end connected to one of the first mentioned members and its outer end connected to the other of said members.

10. The combination, with a pair of relatively movable members, of a base having a curved projection rigid therewith, a second curved projection, a spring interposed between said projections, a band having one end secured to one of said projections and wrapped around the other projection, means connecting said base to one of the relatively movable members, and means connecting the outer end of the band to the other member.

11. A device of the character specified comprising a pair of opposed curved projections, a compression spring interposed between said projections, and a composite spring metal and flexible band wrapped a plurality of times about both of said projections.

12. A device of the character specified comprising a pair of opposed members, a compression spring interposed between said members, and a composite band wrapped around said members, said band comprising alternating convolutions of spring metal and flexible friction material.

13. In a device of the character specified, the combination of a base, a curved member rigid with said base and having a spring support, a second curved member having a spring support slidably mounted with respect to the other support, a compression spring interposed between said members and mounted upon the outer support, a spring metal band secured at one end to the fixed member, a band of flexible material also secured to said member outside the first mentioned band, said bands being wrapped a plurality of times about said members and the outer end of the first mentioned band being secured to the second band and the outer end of the latter band extending beyond the outer end of the former band.

14. In a device of the character specified, the combination of a base having a curved member rigid therewith, said member being provided with a projection, a second curved member having a projection slidably mounted with respect to the first projection, a compression spring mounted upon the support formed by said projections, the second member having one end in substantially the plane of the corresponding end of the first member and having its other end outside of a plane passing through the corresponding other end of the first member, and a flexible band having one end secured to the last mentioned end of the first member and wrapped around said members.

15. In a device of the character specified, the combination of a spring of the compression type, means for supporting the same, a flexible band wrapped around said spring, and means tending to open the convolutions of said band.

16. In a device of the character specified, the combination of a spring of the compression type, means for supporting the same, a band of spring metal wrapped around said spring, and friction material interposed between some of the convolutions of said band.

17. In a device of the character specified, the combination of a spiral or helical spring, means within the spring and additional thereto for yieldingly resisting the closing movement thereof, a support for such yielding means, and a flexible or pliable band wrapped around the said spring.

18. In a device of the character specified, the combination of a contractible and expansible spring, a flexible band wrapped a plurality of times around said spring, and means tending to open the convolutions of said band.

19. The combination, with a pair of relatively movable members, of an abutment connected to one of said members, an abutment opposed to the first mentioned abutment, a spring interposed between said abutments, and a flexible device connecting the second abutment to the other movable member.

20. In a device of the character set forth, the combination of a pair of abutments, a tubular guide projecting from one of said abutments, a projection extending from the other abutment and fitting within said guide, a spring interposed between said abutments, and a flexible member connected to one of said abutments.

21. In a device of the character set forth, the combination of an abutment, a tubular guide projecting from said abutment, a second abutment having a portion fitting within said guide, a coiled spring interposed between said abutments, and a flexible member connected to one of said abutments.

22. In a device of the character set forth, the combination of a pair of relatively movable abutments, a tubular guide projecting from one of said abutments, a projection extending from the other abutment and slidably fitted in said guide, a coiled spring interposed between said abutments, and a flexible member connected to one of said abutments for moving the same toward the other against the action of said spring.

23. The combination, with a pair of relatively movable members, of an abutment connected to one of said members, a second abutment opposed to the first mentioned abutment, a tubular guide projecting from one of said abutments, a projection carried by the other abutment and telescoping within said guide, a spring interposed between said abutments, and a flexible device connecting the second abutment and the second movable member.

In testimony whereof, I hereunto affix my signature in the presence of two witnesses.

CLAUD H. FOSTER.

Witnesses:
J. B. HULL,
BRENNAN B. WEST.